No. 887,973. PATENTED MAY 19, 1908.
M. SMITH & G. A. SEYFFERT.
TIRE SETTING MACHINE.
APPLICATION FILED NOV. 22, 1906.
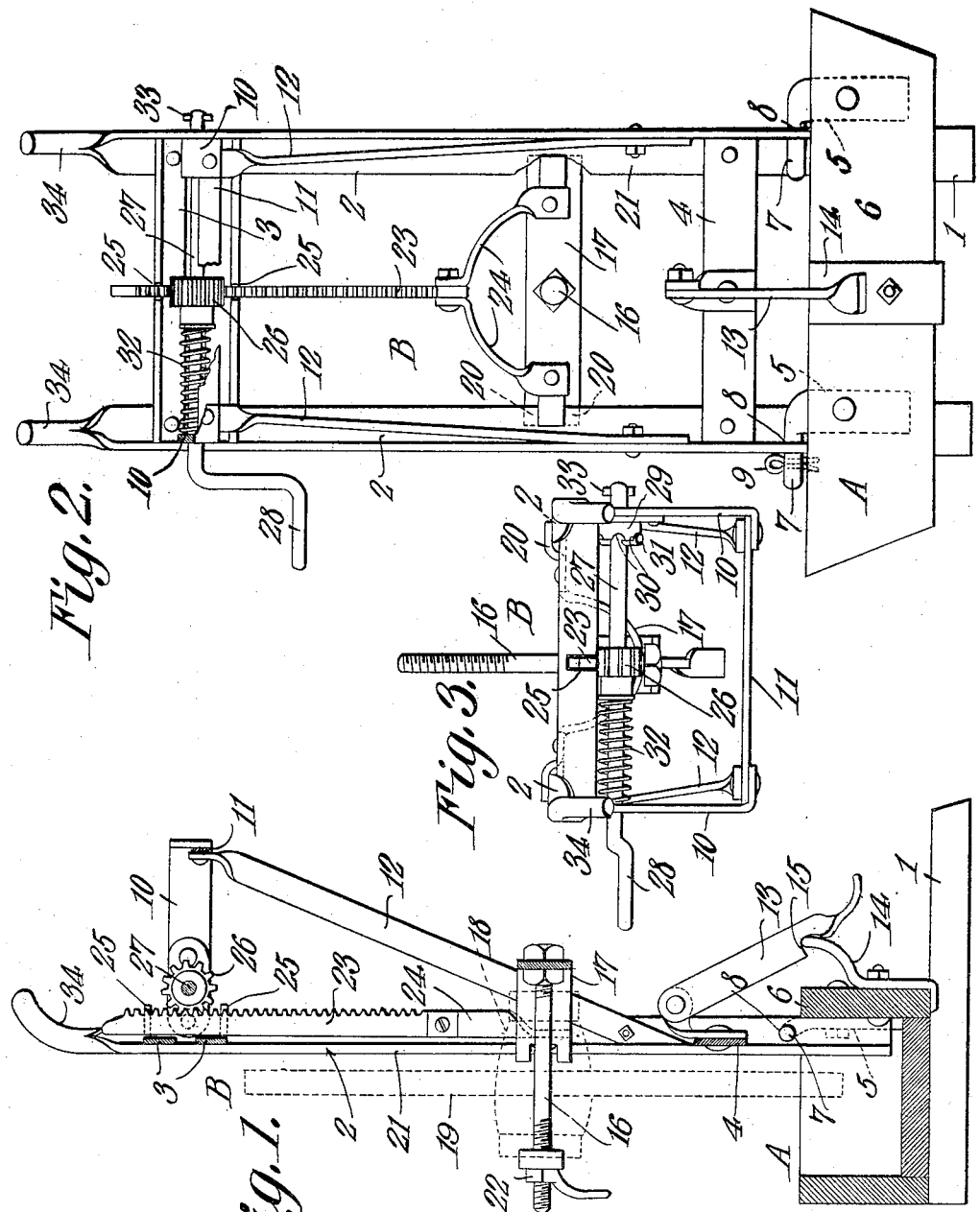
WITNESSES:
E. J. Stewart
C. Bradway.
Milo Smith
Gustave A. Seyffert INVENTORS
By C. A. Snow & Co.
ATTORNEYS

UNITED STATES PATENT OFFICE.

MILO SMITH AND GUSTAVE A. SEYFFERT, OF LAMAR, MISSOURI.

TIRE-SETTING MACHINE.

No. 887,973.　　　　　Specification of Letters Patent.　　　　Patented May 19, 1908.

Application filed November 22, 1906. Serial No. 344,616.

*To all whom it may concern:*

Be it known that we, MILO SMITH and GUSTAVE A. SEYFFERT, citizens of the United States, residing at Lamar, in the county of Barton and State of Missouri, have invented a new and useful Tire-Setting Machine, of which the following is a specification.

This invention relates to a tire setting machine of that type comprising a tiltable frame on which the wagon wheel having its tire reset is rotatably mounted, and a water containing trough arranged in coöperative relation with the frame so that the wheel can be immersed in the water for the purpose of quickly and effectively cooling the tire before the felly becomes burned or charred.

The invention has for one of its objects to improve and simplify the construction and operation of this class of machines, so as to be of substantial and durable form and convenient and reliable in use.

A further object of the invention is the provision of a simple and effective means whereby the wheel can be adjusted vertically on the supporting frame to permit the tire to be immersed when there is only a small quantity of water in the trough.

Another object of the invention is to construct a supporting frame largely of angle iron which is hingedly mounted on the trough in such a way as to be readily detached therefrom, which is adapted to be lowered to a horizontal position when it is desired to use the same as a work trestle and which can be firmly latched or supported in an upright position on the trough.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawings, which illustrate one of the embodiments of the invention, Figure 1 is a central vertical section of the machine. Fig. 2 is a rear elevation of the machine, partly broken away. Fig. 3 is a plan view.

Corresponding parts in the several figures are indicated throughout by similar characters of reference.

Referring to the drawing, A designates the trough of the machine and B the wheel supporting frame hingedly mounted on the trough. The trough A may be of any approved construction and is provided with base members 1 which serve to form a comparatively large supporting base for the machine. These members, which constitute feet, extend rearwardly from the bottom of the trough, so as to be out of the way of the operator stationed in front of the machine.

The frame B comprises a pair of parallel uprights 2 rigidly connected and spaced apart by a pair of upper cross pieces 3 and a lower cross piece 4. In order to obtain a maximum rigidity, with lightness, the uprights and upper cross pieces are preferably of angle iron. The hinges for mounting the supporting frame on the trough consist of plates or leaves 5 bolted, or otherwise suitably secured, on the inner surface of the rear wall 6 of the trough, the upper ends of the plates being formed into laterally extending pintles 7, both of which extend in the same direction. Adjacent the lower ends of the uprights 2, the latter are provided with perforations 8 for receiving the pintles 7. A suitable keeper, such as a cotter pin 9, Fig. 2, is provided for one of the pintles, so as to prevent the frame from accidentally moving laterally off the pintles. The pintles 7 are disposed above the top edge of the rear wall 6 of the trough, so that the supporting frame B can swing from a vertical to a horizontal position, or vice versa. Extending rearwardly from the uprights 2 adjacent the upper end of the frame B are legs 10 which are connected at their outer ends by the cross piece 11 and braced from the uprights 2 by the inclined braces 12. These legs 10 serve to support the frame B in a horizontal position when the latter is swung down on its hinges for the purpose of placing the wheel thereon or using the frame as a work trestle. In order to hold the frame B in an upright position, a latch member 13 is hinged on the lower cross piece 4 and is adapted to lock on the catch 14 secured to the rear side of the trough. The latch 13 is provided with a notch 15 that engages the upper end of the catch 14, and the lower extremity of the latch is curved rearwardly to form a foot piece whereby the latch can be fastened or unfastened by the foot of the operator.

The wheel which is having its tire set is mounted on the frame B by means of a spindle 16 which is supported at its rear end on the cross head 17 which is movable longitudinally of the frame. The cross head 17 is arched laterally at its center so as to receive the hub 18 of the wheel 19 when the latter is mounted on the spindle 16. The ends of the cross head 17 are formed into lugs 20 that engage on opposite sides of the webs 21 of the upright 2, so as to be guided vertically by the latter. The outer end of the spindle 16 is threaded and equipped with a crank nut 22.

The cross head 17 is raised or lowered by a pinion and rack mechanism, the rack 23 of which being connected at its lower end to the cross head by the arms 24, Fig. 2, and guided at its upper end between the walls of slots 25 in the upper cross pieces 3 of the frame B.
The pinion 26 is rigidly secured to a horizontal crank shaft 27 journaled at its end in the legs 10, shown more clearly in Fig. 3. One end of the shaft 27 is provided with a handle or crank 28 whereby the pinion can be rotated by hand. By turning the crank in one direction or the other, the cross head 17 with the wheel on the spindle 16 can be raised or lowered to any desired point, so as to enable wheels of different diameters to be used on the machine and for permitting a wheel to be lowered to the very bottom of the trough, as when the quantity of water in the latter is very shallow.

In order to hold the cross head in fixed position after it is adjusted, a suitable stop device is provided. This device comprises a stationary collar 29 on the inner surface of the right leg 10, Fig. 3, which is provided with spaced radially extending notches 30 in which a cross pin 31 on the shaft 27 is adapted to engage. In order to engage and disengage the pin 31, the shaft 27 is mounted to have a limited longitudinal movement. A helical compression spring 32 is mounted on the shaft 27 with one end abutting the left leg 10 and the other end abutting the hub of the pinion 26. This spring tends to normally hold the pin 31 in engagement with the notched collar 29. The axial dimension of the pinion 26 is sufficient to permit the pinion to permanently mesh with the rack 23 as the shaft is moved to the right or left for the purpose of engaging and disengaging the stop pin 31. The end of the shaft 27 opposite from the crank 28 is provided with a cotter pin 33 disposed on the outside of the right leg 10 so as to prevent the shaft 27 being moved too great an extent. With the parts shown in the position in Fig. 3, the stop device operates to hold the cross head in fixed position. When it is desired to raise or lower the cross head, the operator pulls on the crank 28 so as to move the shaft 27 longitudinally against the tension of the spring 32. The stop pin 31 is thus released from the notched disk or collar 29, so that the shaft can be rotated. While the shaft is held in this position, the operator turns the crank in the required direction, thereby rotating the pinion 26 and moving the rack 23 together with the cross head and wheel on the spindle thereof. When the desired point is reached, the operator permits the crank shaft to move under the pressure of the spring 32, so that the stop pin 31 will engage the nearest notches of the collar or disk 29. The shaft 27 is thus prevented from rotating and the wheel is supported in fixed position on the machine. To facilitate the swinging of the frame B from one position to the other, the upper ends of the uprights 2 are formed into handholds 34.

From the foregoing description, taken in connection with the accompanying drawing, the advantages of the construction and of the method of operation will be readily understood by those skilled in the art to which the invention appertains, and while we have described the principle of operation of the invention, together with the apparatus which we now consider to be the best embodiment thereof, we desire to have it understood that the apparatus shown is merely illustrative, and that such changes may be made, when desired, as are within the scope of the claims.

What is claimed is:—

1. In a tire setting machine, the combination with a trough, of a wheel supporting frame mounted in vertical relation thereto, a cross head guided to operate vertically in said frame and having a wheel supporting device thereon, an operating shaft journaled in said frame and movable axially relatively thereto, a notched collar arranged in fixed relation to the frame, a pin mounted in fixed relation to the shaft, a spring acting to operate the shaft axially to retain the pin and collar in coöperative relation, and an operative connection between said shaft and the cross head.

2. In a tire setting device, the combination with a trough, of a frame mounted in vertical relation therewith, a cross head mounted to operate vertically on the frame and having a wheel supporting device thereon, mechanism on the frame for raising and lowering the cross head, and a stop device coöperating with said mechanism for yieldingly retaining it in different adjusted positions.

3. In a tire setting device, the combination with a trough, of a frame arranged in vertical relation to the trough, a cross head mounted to operate vertically on the frame and having a wheel supporting device thereon, a rack connected to the cross head, a pinion coöperating with the rack and rotatably mounted on the frame, and a stop device for yieldingly retaining the pinion in different positions of adjustment to prevent vertical movement of the cross head relatively to the frame.

4. In an apparatus of the class described, the combination of a trough, with a wheel supporting frame, a cross head guided on the frame, a spindle on the cross head adapted to receive a wheel hub, a rack connected with the cross head, a crank shaft mounted on the frame to rotate and to have a limited longitudinal movement, a spring on the shaft for returning the same after being moved longitudinally in one direction, a pinion on the shaft meshing with the rack, and a stop device normally operating to prevent rotation of the pinion shaft by reason of the longitudinal movement of the shaft under the action of said spring.

5. In a tire setter, the combination with a trough, of a wheel supporting frame mounted in pivotal relation therewith, a cross head mounted adjustably in the said frame and adapted to receive the wheel, a rack operatively connected to said cross head and guided on said frame, a pinion shaft revolubly mounted in said frame and capable of a relative axial movement, a pinion on said shaft coöperating with the rack on the cross head, a collar surrounding the pinion shaft and secured to the frame and having a series of radially arranged recesses thereon, a radially extending pin in the pinion shaft arranged to coöperate with the recesses in said collar, and a spring surrounding the pinion shaft and normally operated to hold said pin and collar in coöperative relation with a yielding pressure.

In testimony that we claim the foregoing as our own, we have hereto affixed our signatures in the presence of two witnesses.

MILO SMITH.
GUSTAVE A. SEYFFERT

Witnesses:
W. W. BASSETT,
J. S. ALLEN.